July 7, 1970     T. W. FARGO ET AL     3,519,836
FIBER OPTIC SCANNING SYSTEM HAVING LIGHT RAY PULSING MEANS
Filed Sept. 15, 1966
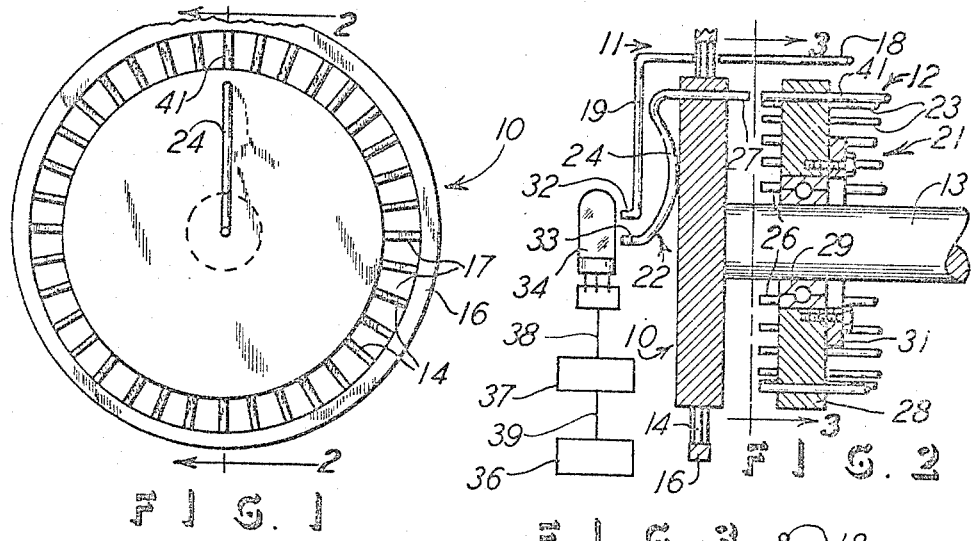
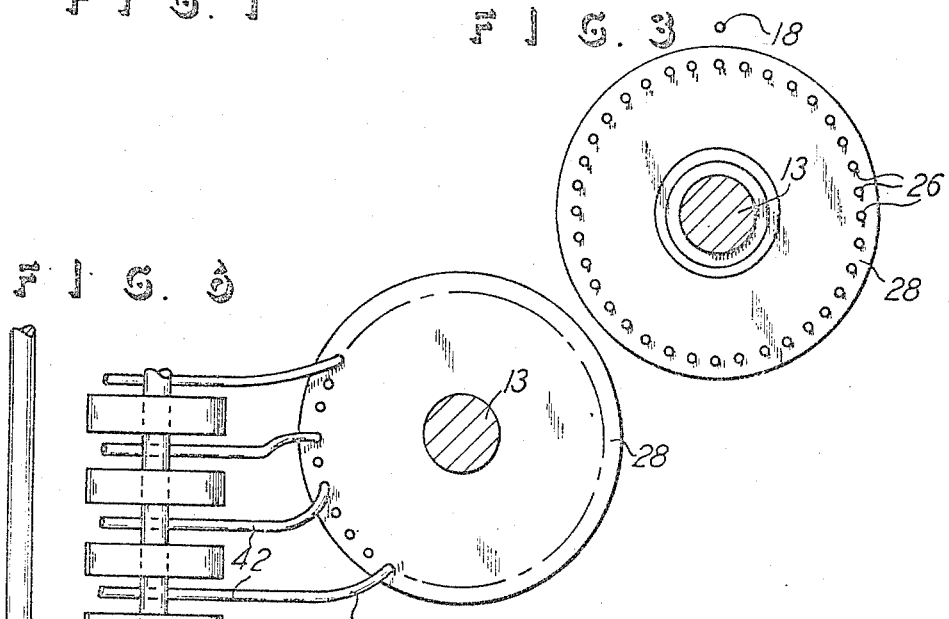
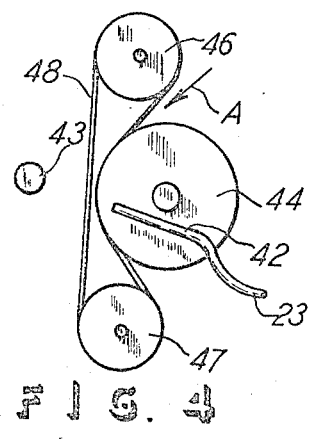
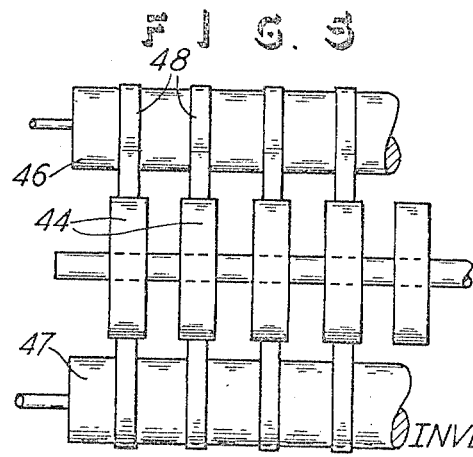
INVENTORS:
JAMES W. FARGO
THOMAS W. FARGO
JAMES J. WOLAK

United States Patent Office 3,519,836
Patented July 7, 1970

3,519,836
FIBER OPTIC SCANNING SYSTEM HAVING LIGHT RAY PULSING MEANS
Thomas W. Fargo, Racine, James W. Fargo, Kenosha, and James J. Wolak, Brookfield, Wis., assignors to Custom Control Products, Inc., Racine, Wis., a corporation of Wisconsin
Filed Sept. 15, 1966, Ser. No. 579,721
The portion of the term of the patent subsequent to Nov. 5, 1985, has been disclaimed
Int. Cl. G01b 19/36; G02b 5/14
U.S. Cl. 250—227  5 Claims

ABSTRACT OF THE DISCLOSURE

A method and apparatus for optical scanning comprising steps and means for conducting light rays along two separate paths, the step and means for sensing the light rays and for pulsing the light rays in one of the paths, and the step and means for combining the light rays to negate the pulsing, and the step and means for interrupting the light rays in the other of the paths to permit the pulsing light rays to be sensed.

---

This invention relates to a method and means for optical scanning.

This particular invention has application in the art of detecting the presence of objects to count the objects as they move past a station, to detect the size of the objects, to measure the area of the objects, to determine positions and relative sizes of objects, and like purposes. The particular disclosure mentioned hereinafter is directed at the method and means for measuring the area of objects. It will of course be understood that the portion of the invention as related to scanning has applications in other fields, such as some of those already mentioned. However, for the purpose of showing one specific application of this invention, the following disclosure is with regard to the measurement of the area of objects. These objects may be of irregular shape, but the invention will nevertheless accomplish the measurement of the area of the object as the latter moves past a station.

Apparatus for measuring the area of objects is not heretofore unknown. However, certain of the known apparatus is complex in its construction, whether it be mechanical or electronic or of any other nature. Also, some of this prior apparatus requires external generators, synchronizers, and other complex components. Still further, the prior apparatus and method are known to require a focusing means, such as lenses, and require multiple photoelectric cells, and external pulse generators. In this regard, prior apparatus which employs external electric pulse generators generally does so in order that a pulse can be generated only when object being examined is present. Without the external electric pulse generator, the prior apparatus has generated its pulses only when the object is not present. In either case, it is not deemed desirable to do it that way, and the present invention improves upon that.

Accordingly, it is a general object of this invention to provide an improved method and means for scanning objects. More particularly, it is an object of this invention to provide a simple, easily constructed, easily operated, inherently synchronized, accurate, and a functionally stable method and means for scanning objects.

Still another object of this invention is to provide the method and means for scanning objects, wherein only a few electrical components are employed and they generate electrical pulses only when the object being scanned is present, but yet no separate and external pulse generator is required.

Still another object is to provide an item or object detection method and means wherein rays, such as rays of light, are utilized in a manner that there is no reflectance or other disturbance in the transmission and detection of the light rays so that the most accurate measurements can be made.

Other objects and advantages become apparent upon reading the following description in light of the accompanying drawings, wherein:

FIG. 1 is a front elevational view of an embodiment of a scanner of this invention.

FIG. 2 is a sectional view taken along the line 2—2 of FIG. 1, and showing parts added thereto.

FIG. 3 is an end elevational view, and taken along the line 3—3 of FIG. 2.

FIG. 4 is a side elevational view of apparatus for handling objects being examined, and the view shows a portion of the scanner.

FIG. 5 is a side elevational view of FIG. 4, in fragment.

FIG. 6 is a top plan view of FIG. 4, in fragment, and adding a portion of the scanner thereto.

The scanning apparatus of this invention is generally disclosed in FIGS. 1, 2, and 3. FIGS. 4, 5, and 6, show conveyor apparatus which may be used with the scanner for the purpose of moving an object through the apparatus for measuring the area of the object or any other purpose aforementioned. Thus the important aspect is that FIGS. 1, 2, and 3, which show the scanner, show the basic invention, and the conveyor means simply shows one form for moving objects into the range of the scanner.

The scanner is shown to include a rotating disk 10, a first set of light ray conductors 11 and a second set of light ray conductors 12. The disk 10 is rotatably mounted on a shaft 13, and it has a plurality of spokes or blades 14 spaced circularly around the disk 10. A rim 16 simply covers the radial ends of the portions or blades 14, and it will be understood that the areas shown intermediate the blades 14 are openings 17 extending through the disk 10. The blades 14 are shown equally spaced around the disk 10, and FIG. 2 shows that the light conductor set 11 is oriented with respect to the blades 14. Thus the set 11 has a section 18, which is a single light conducting member or transmitting rod, and it has a second section 19 which is also a single light conducting member or transmitting rod. Thus rotation of the disk 10 will cause a pulsing of light rays being conducted through the said set 11 and between the members 18 and 19. Such pulsing is of course created by the alternate alignment of the openings 17 and the blades 14 with respect to the axially aligned conductors 18 and 19.

The second set of light ray conductors 12 consists of the section 21 and the section 22. The section 21 has a plurality of members or fiber optic rods 23, while the section 22 has only a single conductor or fiber optic rod 24. Again it will be understood that the ends 26 of the conductors 23 and the end 27 of the conductor 24 are axially aligned and oriented with respect to each other so that upon rotation of the disk 10, which carries the member or section 22, the end 27 scans the ends 26. FIG. 3 therefore shows that the ends 26 are circularly spaced on a support 28 which is stationary, and a bearing 29 is shown interposed between the rotating shaft 13 and the mounting or fixed member 28. Thus light transmitted along the fiber optic rods or members 21 is conducted to the fiber optic rod 24. The scanning is thus possible by the alignment of the sections 21 and 22, as described, and by the stationary mounting of the member 28 through a frame or like support 31 which is shown to provide a fixed positioning of the circularly shaped member 28, and it is so shaped at least for the circular positioning of the fiber optic members 23.

FIG. 2 further shows that the sections 11 and 22 have their respective conductors terminating in ends 32 and 33 which are oriented with a photo-electric cell 34. The photo-electric cell is of course a photo-sensitive member which when light rays are directed to the cell 34 in a pulsing manner, the cell generates a signal. This signal may now be understood to be relayable to a conventional signal recorder 36 through an amplifier 37. Connections 38 and 39, of an electric type, are shown between these three components for the obvious purpose of relaying the signal to the recorder 36, if such is desired.

It will be further noted that the conductor 24 is shown aligned with one of the blades 14, namely the blade specially numbered 41. Also, the number and spacing of the blades 14 is the same as the number and spacing of the conductors 23. Finally, the arrangement of the conductors in both sets is such that for instance in the position in FIGS. 1 and 2, the conductors 18 and 19 are aligned with the blade 41 and are thereby blocked so that no light rays are conducted in the first set 11 at that moment, and simultaneously the conductors 24 and the upper one designated 41 in the stationary section 21 are aligned to conduct light rays therebetween.

This arrangement thereby provides the conduction of light rays from ones ide of the scanning disk 10 to the photo-sensitive member 34 at all times and without pulsing or interruption. This is true since when the first section 11 is blocked out the second section 12 is conducting light rays to the cell 34.

To complete the description of the scanner, reference is made to FIGS. 4, 5, and 6, where it is seen that the section 12 has terminal ends 42 of the fiber optic members 23. These ends are disposed and oriented and directed toward a light tube 43 which may be a fluorescent tube and is a light source directing light rays to the fiber optic members or conductors 23.

Thus the method and apparatus will be understood to consist of a scanning device having a first light ray conductor set 11 and a second light ray conductor set 12. The sets have their terminal ends 32 and 33 exposed to a photo-sensitive member 34, and they have their other terminal ends exposed to any other light source, such as the light source 43 to which the terminal ends 42 of conductor set 12 are exposed. The first conductor set 11 creates a light pulsing by virtue of it being stationary and having the scanning wheel or disk 10 rotating therepast with the alternate opaque portions 14 and open portions 17 passing in alignment with the members 18 and 19 of the section 11. Finally, the second conductor set 12 is arranged to have the one section 22 rotate with the disk 10 while the other section 21 is stationary, and the entire set 12 conducts light rays from the source 43 to the photo cell 34 at at least the times when the light rays in the first set 11 are being blocked with respect to the photo cell 34. Thus the light rays are always being transmitted to the photo cell 34, at least as far as the apparatus and function described to this point are concerned.

Therefore, the interruption of the transmission of light rays through the second set 12 and to the photo-sensitive cell 34 will leave only the pulsing light rays transmitted through the first set 11 effective on the photo cell 34. This pulsing is that which was previously mentioned and is of course recorded in the recorder 36.

Thus FIGS. 4, 5, and 6, show a conveyor system which consists of a drum 44 and two pulleys 46 and 47. Around these three members are trained the belts 48. Thus the feeding of opaque material or an opaque object, such as an irregularly shaped leather hide, or of course any other object which is to be detected by area measurement, presence, or the like, can be fed into the conveyor means in the direction of the arrow indicated A. The object will then be carried intermediate the fiber optic member end 42 and the light source 43 to block out the light rays going to the end 42. This will therefore leave the first set 11 to pulse.

FIG. 6 shows that the ends 42 are spaced along the conveyor, and they are somewhat arbitrarily led therefrom so that these members 23 can be arbitrarily connected to the stations existing in the member 28, as shown in FIG. 6. Since the fiber optic member 24 rotates past the ends 26 to scan them in sequence, the staggering of the ends 26 as mentioned will permit a more accurate measurement of the area of the object being fed into the conveyor means. That is, an advance point to one side of the object may be detected, while a spaced advanced point elsewhere on the object may also then next or at least soon be detected thereafter. This therefore provides for more accuracy in a random scattering of the ends 42.

The method is of course inherent in the aforementioned description, including the description of the apparatus. Also, it will be understood that each of the light ray conductor sets 11 and 12 form paths of light rays, and these paths are the respective sections described, including the section 21. It will further be understood that the generation of the pulse as mentioned is of course caused by the absence of light at the photo cell 34. Depending upon the nature of the light source fed into the first set 11, the pulses in the set 11 will be determined and that is it may be desirable to consider a direct current light source so that the inherent pulsing of alternating current will not be impressed upon the first set 11, however in many instances alternating current can also be employed.

The conveyor section is of course shown to have the rotatable drum 44 and rotatable pulleys 46 with the spaced-apart belts 48 so that the conductor ends 42 can detect the presence of the object fed into the conveyor. However, it will be readily apparent that the conveyor may be made of transparent materials such as a transparent belt type sheet of one continuous width so that the light rays from the source 43 can penetrate the transparent sheet and be detected by the fiber optic member 42.

Of course the speed of rotation of the disk 10 and the movement of the conveyor 48 should be synchronized in order to give readings regarding, for instance, area measurement. Thus if the conductor members 23 are spaced one-tenth of a foot from each other, and if the conveyor belt is interconnected therewith so that the disk 10 is rotated one revolution for each increment of movement of the belt 48, then each pulse generated will correspond to a given increment of area. So, if the increment of spacing of the members 23 and the increment of movement of the belt 48 are both one-tenth of a foot per unit of time, then the pulse will correspond to one-hundredth of a square foot.

While a specific method and apparatus of this invention has been shown and described, it should be obvious that certain changes could be made in the embodiment and the invention should therefore be determined only by the scope of the appended claims.

What is claimed is:

1. An optical scanning device to detect an opaque object, comprising a rotatably mounted disk having a plurality of circularly spaced portions for intermittently blocking the passage of light rays through said disk upon rotation of the latter, a first set of light ray conductors having a section thereof disposed on each side of said disk and adapted to transmit light rays through and between said sections and oriented with respect to said disk portions for periodically blocking transmission of light rays between said sections upon rotation of said disc, a second set of light ray conductors for transmitting light rays completely therethrough when said light rays in said first set of conductors are absent, a photo-sensitive member responsive to the alternate presence and absence of said light rays directed thereat, each of said sets of light ray conductors having a single conductor with an end adjacent said photo-sensitive member to conduct said light rays thereto, said single conductor of said first set further having a light-receiving end adjacent the section of said disc including said plurality of circularly spaced portions, said single conductor of said second set being rotatable with said disc and further having a light receiving end aligned with the space between two of said circularly spaced portions, the other conductors of said second set being positioned on the opposite side of said disc for passing light to said rotatable conductor when light to said single conductor of said first set is blocked, a light source exposed to the other terminal end of each of said sets of conductors and adapted to create said light rays conducted to said photo-sensitive member, and with said second set of conductors being adapted to have said light rays interruptable in emission from said light source to said second set of conductors, by the presence of said object between said light source and said second set of conductors, to leave only pulsing light rays in said first set of conductors to cause said photo-sensitive member to repond.

2. The subject matter of claim 1, including conveyor means disposed intermediate said light source and said second set of conductors for moving said opaque object therebetween to detect the presence of said object by said photosensitive member.

3. The subject matter of claim 2, wherein said other terminal end of said second set of conductors are a plurality of separate ends spaced apart adjacent said light source and said conveyor means is oriented to move said opaque object across the path of the light rays from said light source and at a speed synchronized with the speed of rotation of said disk for interrupting the transmission of emitted light rays to said second set of conductors in accordance with the projected area of said opaque object transverse to said emitted light rays.

4. The subject matter of claim 1, including recording means connected to said photo-sensitive member for recording the number of signals created by said photo-sensitive member.

5. An optical scanning device for a method of optical scanning to detect an opaque object, comprising means for conducting light rays along two separate paths, a common means for sensing all said light rays including any pulsing light rays, means for pulsing said light rays in one of said paths to have said light rays in said one of said paths alternately present and absent at said common means, means for directing said light rays in the other of said paths to said common means at least when said light rays of said one of said paths are absent at said common means and to relate said light rays of said other path with the pulsing ones of said light rays in said one path to continuously conduct light to said common means for sensing, and means for passing said opaque object across said other path of said light rays for interrupting the conduction of said light rays in said other path to said common means to leave said pulsing ones of said light rays for sensing at said common means only in accordance with any detectable pulsing.

References Cited

UNITED STATES PATENTS

| | | | |
|---|---|---|---|
| 3,167,605 | 1/1965 | Heidenhain. | |
| 3,192,391 | 6/1965 | Ressler | 250—227 |
| 3,237,012 | 2/1966 | Treffeisen | 250—227 X |
| 3,325,594 | 6/1967 | Goldhammer et al. | 250—227 X |
| 3,349,325 | 10/1967 | Bajars. | |
| 3,354,319 | 11/1967 | Loewen et al. | 250—227 |
| 2,618,752 | 11/1952 | Besson | 250—220 |
| 2,819,409 | 1/1958 | Williams | 250—233 |
| 3,036,153 | 5/1962 | Day | 250—96 X |
| 3,249,692 | 5/1966 | Clay et al. | 350—96 X |
| 3,256,767 | 6/1966 | Bousky | 350—96 |
| 3,312,140 | 4/1967 | Dokoupil | 350—96 X |
| 3,393,800 | 7/1968 | Durand | 250—223 X |
| 3,409,780 | 11/1968 | Fargo et al. | 250—223 |

ROBERT SEGAL, Primary Examiner

U.S. Cl. X.R.

356—167